United States Patent

[11] 3,600,950

| [72] | Inventor | Rudolph Bergsma<br>Ann Arbor, Mich. |
|---|---|---|
| [21] | Appl. No. | 847,593 |
| [22] | Filed | Aug. 5, 1969 |
| [45] | Patented | Aug. 24, 1971 |
| [73] | Assignee | Chrysler Corp.<br>Highland Park, Mich. |

[54] FLUID PRESSURE RESPONSIVE TRANSDUCER
5 Claims, 5 Drawing Figs.

[52] U.S. Cl. .................................................. 73/398 AR,
73/397, 73/406
[51] Int. Cl. ............................................................ G01l 9/02
[50] Field of Search ................................................ 73/397, 398
R, 406; 338/42, 41; 92/94; 267/151, 161

[56] References Cited
UNITED STATES PATENTS

| 1,106,681 | 8/1914 | Sauvage | 73/397 X |
| 2,057,576 | 10/1936 | Johnson | 73/397 |
| 2,846,549 | 8/1958 | Boddy | 338/42 |
| 2,824,919 | 2/1958 | Davis | 200/83 |
| 2,911,606 | 11/1959 | Hoffman | 73/406 |
| 3,439,541 | 4/1969 | Gilder | 73/398 |

*Primary Examiner*—Donald O. Woodiel
*Attorney*—Harness, Talburtt and Baldwin

ABSTRACT: A fluid pressure responsive transducer of the variable impedance or rheostatic type operative over a wide range of fluid pressures and exhibiting an enhanced or increased sensitivity and response characteristic over a low-pressure portion of the operating range thereof. The device includes a displaceable diaphragm member exposed to a source of variable fluid pressure and variable impedance means operatively responsive to displacement of said member and features a multiple rate spring in the form of a Belleville spring and a coil spring acting upon said member to provide a different rate of response to displacement of said member to low fluid pressures than that presented thereby to higher fluid pressures within the operating range of the device.

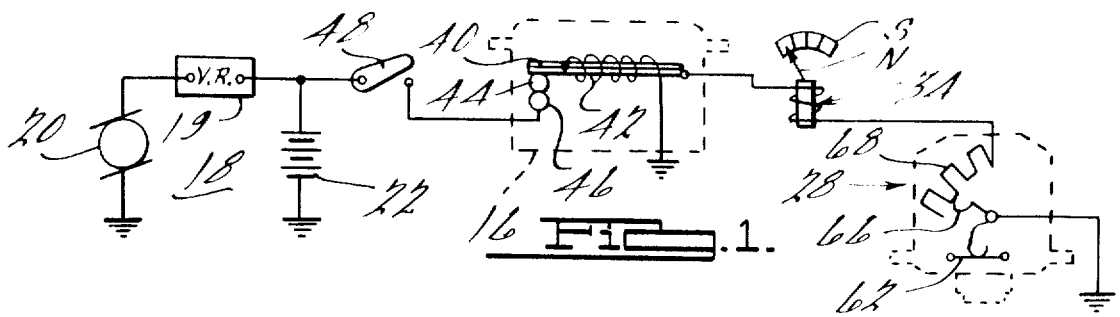
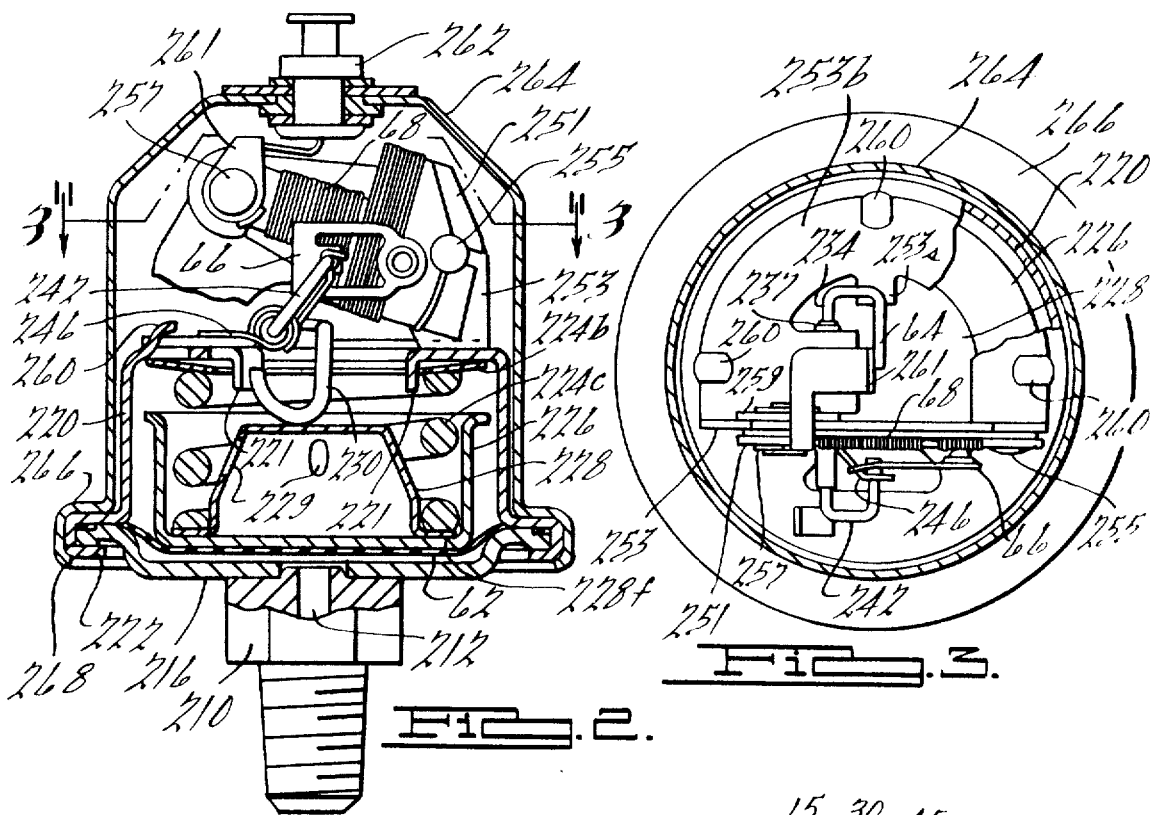
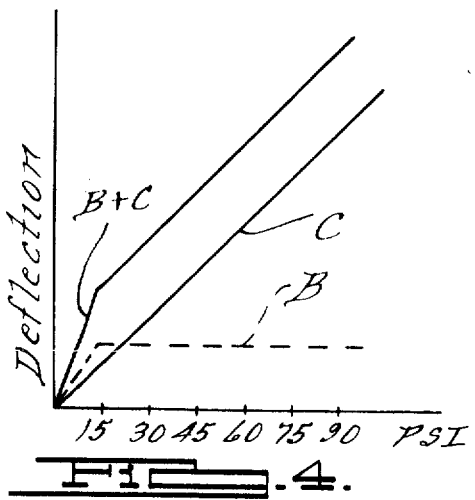
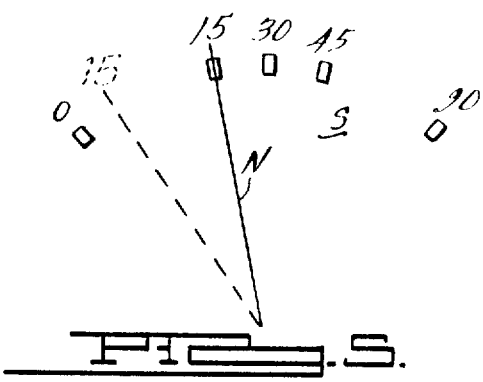
INVENTOR.
Rudolph Bergsma
BY
Harness, Talburtt & Baldwin
ATTORNEYS

FLUID PRESSURE RESPONSIVE TRANSDUCER

BACKGROUND OF THE INVENTION

This invention relates to fluid pressure responsive transducer devices as employed in engine oil pressure-gauging systems.

A form of pressure responsive transducer device commonly employed in engine oil pressure-gauging systems for automotive vehicles is shown in U.S. Pat. No. 2,849,549 entitled PRESSURE INDICATING DEVICE. The device is of the variable impedance rheostatic variety, the electrical circuit resistance of which is varied in accordance with the displacement of a flexible diaphragm member subjected on one side to engine oil pressure and on the other to a biasing force of a spring member.

In automotive engine oil pressure applications such devices are intended to operate over a relatively wide range of fluid pressures of from 0 to, say, 90 to 100 p.s.i., which is remotely displayed on an electrical-type indicating gauge. The gauge is connected in electrical circuit with a source of electrical energy and the transducer device, which modulates the energy supplied to the indicating gauge to produce a needle or pointer deflection of the gauge in accordance with the fluid pressure condition being continuously monitored.

In order to operate over such a wide range of pressures, the diaphragm operates against the pressure of a relatively stiff spring. For low engine oil pressures as encountered at low engine or idling speeds, the use of such a stiff spring produces a relatively small displacement of the diaphragm and a relatively low or small deflection of the needle of the indicating instrument that is apt to be erroneously interpreted as a loss of engine oil pressure.

Accordingly, the present invention has for its general object to provide an improved form of pressure-responsive transducer construction for use in such pressure-sensing and gauging systems.

A specific object is to provide an improved form of pressure-responsive transducer construction operative over a wide range of oil pressures encountered in an automotive engine, while exhibiting an increased sensitivity or response characteristic that increases or expands the resultant displayed oil pressure condition and associated indicating instrument for such low engine oil pressure conditions.

A related object is to provide a pressure responsive sensing device possessed of the above-stated characteristics without increasing the size or physical dimensions of the device.

SUMMARY OF THE INVENTION

In accordance with the invention there is provided a transducer utilizing a Belleville spring and a coil spring construction opposing the displacement of a member, which is exposed to a variable fluid pressure and is coupled to a variable resistance to effect a related change in the resistance thereof. The Belleville spring presents a low rate of opposition to displacement of the fluid pressure exposed member in order to increase the sensitivity and response of the transducer and associated gauging system for a low fluid pressure portion of the operating range of the transducer. The coil spring presents a higher rate of opposition to displacement of said member to extend the range of operation of the transducer and gauging system beyond that afforded by the Belleville spring.

The above and other objects together with the advantages and the manner of accomplishment thereof will be understood from the detailed description of a preferred embodiment of the invention made with reference to and following the accompanying drawings.

DESCRIPTION OF THE DRAWINGS

FIG. 1 is an electrical schematic circuit wiring diagram of an engine oil pressure-sensing and indicating system;

FIG. 2 is a sectional elevation view with parts broken away of a pressure-sensing device construction in accordance with the present invention;

FIG. 3 is a sectional plan view with parts broken away and taken substantially in the direction of 3—3 of FIG. 2;

FIG. 4 is a graphical presentation of the spring deflection/load characteristic of the spring construction utilized in the device of FIGS. 2 and 3; and FIG. 5 illustrates the increased or expanded needle deflection of the associated indicating gauge obtained for low engine oil pressures with the pressure-sensing device of the present invention.

DESCRIPTION OF THE PREFERRED EMBODIMENT

With reference to FIGS. 2 and 3 of the drawings, the disclosed fluid pressure responsive unit 28 comprises a threaded tubular body 210 provided with a bore 212 therein and adapted to be threaded into the oil system of the vehicle so that bore 212 is in communication with the pressure fluid. Affixed to the body 210 is a dished annular member 216 which carries a flexible diaphragm 62. The diaphragm is clamped between the member 216 and an inverted cup-shaped spring housing or caging member 220 which is assembled to member 216 by inwardly turning the terminal flange 222 thereof.

Located interiorly of the cup member 220 are two additional cup members including an upstanding cup member 226 and an inverted cup member 228. Cup member 228 is of lesser diameter than the surrounding cup members 220 and 226 and has an outwardly extending annular flange 228f formed thereon and resting against the upper side or surface of the bottom of cup member 226, which is suitably affixed to the diaphragm 62.

Coaxially received between the cup members 226 and 228 is a coil spring 224c the lower end of which bears against the flange 228f of cup member 228, which is also provided with vent openings as 229 therein for venting the interior thereof. The spring 224c is part of a spring assembly, which, in accordance with the present invention, further includes a dished-washerlike spring member, commonly known as a Belleville spring 224b. The Belleville spring is located between the upper end of the coil spring 224c and the inner or downwardly facing side of the upper end of the cup member 220. The upper end of the cup 220 has a central annular opening therein and is provided with downwardly turned fingers 221, which act as locators for the spring assembly.

As shown in FIG. 2, the enclosed upper end of cup 228 is contacted by one end 230 of a crank member 64 formed of wire rod and having a straight intermediate body portion 234, which is rotatably journaled in a sleeve bearing 237. Bearing 237 is retained in a bearing mount formed in the arcuately shaped base portion 253b of an upstanding bracket 253 by tongues 260 struck out of cup 220 as shown. Wound about the central portion of the crank body 234 is a torsion spring 246, which is tensioned at one end against the base portion of the bracket plate 253 and at its other end against an inclined upper end portion 242 of the crank member 64. The spring 246 biases the crank member against a limit stop 253s formed on the base portions 253b of the bracket plate 253 to position the crank-operating cup member 228, as shown.

The upper end 242 of the crank carries an electrically conductive wiper arm 66 which is displaceable along and in rubbing electrical contact with a wire resistor 68 wound on a flat insulating card 251. Card 251 is mounted at its opposite ends to the upstanding leg portion of the bracket plate 253 by a pair of rivets 255 and 257 of which rivet 255 is shown connected to one end of the resistor winding 269.

Rivet 257 is electrically insulated from the bracket plate by an insulator bushing 259 and mounts an electrically conductive spring strap 261 to which the other end of the resistor winding 68 is connected. Strap 261 contacts a terminal-connecting stud 262, which is carried on and insulated from an outer shell casing 264 having an outwardly flared base 266 by which it is secured to the assembly by inwardly turning the marginal flange portion 268 thereof. The output resistance of the device is measured or presented between stud 262 and shell casing and varies inversely with the displacement of the diaphragm and corresponding position of the wiper contact 66 which is grounded to the casing and body 210 through crank 64, spring 246, springs 224 b and c, member 220 and disk 216.

With the foregoing arrangement it will be seen that flexible diaphragm 62 serves as a fluidtight seal between bore 212 and the interior of the spring housing 220. Fluid pressure introduced through the bore 212 urges the diaphragm member 62 and elements 226 and 228 upwardly against the continuously downwardly exerted opposing force of the spring assembly 224. Thus, the resultant displacement or position of the cup member 228 and of the crank member 64 operated thereby is at all times a measure of the fluid pressure acting on the oil below the diaphragm. Movement of the crank member 64 correspondingly displaces the wiper contact 66 along the resistor 68, thereby changing or varying the electrical circuit resistance presented between the terminal stud 262 and ground in a decreasing manner or direction with increasing oil pressure.

Electrically the device is connected as shown in FIG. 1 in circuit with a source of electrical power 18 and a remotely located indicating gauge 30, which continuously displays the magnitude of the fluid pressure sensed by the sensing unit 28. The electrical power source 18 is shown as including the vehicle storage battery 22 and the vehicle generator or alternator 20 including the customary vehicle voltage regulator 19. The positive side of the battery and the regulated output of the alternator are connected to one side of the vehicle ignition switch 48, the other side of which is shown connected to an instrument voltage limiter or regulator device 16, which may be of the type shown and described in U.S. Pat. No. 2,835,885. Such regulators are customarily employed in constant voltage gauging systems and serve to maintain the voltage supplied to the gauge 34 and pressure-sensing unit 28 at a more closely regulated and constant voltage level than that otherwise available from the vehicle voltage regulator.

The instrument regulator includes a pair of normally engaged, relatively movable current modulating or interrupting contacts 44 and 46 of which the movable contact 44 is provided on a thermally responsive, polymetallic element 40 which carries a heating coil 42 connected between the element 40 and ground as shown. The output voltage of the voltage limiter appears between the element 40 and ground supplied to the gauging system of which one side or terminal of the indicating gauge 34 is connected to the element 40. The other side or terminal of the gauge 34 is connected to the high potential side of the pressure-responsive transducer device, shown connected electrically to ground.

The indicating gauge 34 may be of the thermally actuated or responsive type shown in U.S. Pat. No. 2,625,132 and is provided with a needle or pointer N, the deflection of which is displayed on a graduated scale. It will be seen that variations in the engine oil pressure acting upon and sensed by the pressure-responsive transducer device 28 varies the electrical circuit resistance thereof in the circuit of FIG. 1 so as to modulate or vary the resulting current through the indicating instrument and produce a deflection of the indicating needle of the gauge related to the magnitude of the current flowing therethrough.

The improved operation and effect of the disclosed pressure-sensing unit 28 will be apparent from consideration of FIGS. 4 and 5 of which FIG. 4 represents the deflection vs. load characteristics of the Belleville and coil springs, and FIG. 5 illustrates the resulting display of the indicating gauge 34.

Line C represents the characteristic of the coil spring 224c whose deflection and spring rate are selected with respect to the permissible displacement of the diaphragm and range of operating pressures to be sensed and displayed by the gauging system. For low oil pressures, it will be appreciated that the spring 224c produces or permits relatively small displacements of the diaphragm 62 and changes in the output resistance of the sensing unit 28. Accordingly, relative small deflections of the indicating needle of gauge 34 are produced at low oil pressures as encountered at engine idling speeds, as indicated by the dotted line of FIG. 5.

The characteristic of the Belleville spring 224b is plotted at B of FIG. 4 which will be noted to have a greater slope or lesser spring rate over its range of spring operation than that of the coil spring c. Spring rate as used herein is defined as the reciprocal of the slope of the spring deflection vs. load characteristic, so that the greater the spring rate, the greater the load required to produce a given deflection of the spring.

The addition of the Belleville spring 224b to the disclosed pressure-sensing unit thus creates a multiple rate compound spring assembly having a resulting characteristic represented by the plot labeled B + C of FIG. 4. The Belleville spring has a lesser spring rate or greater spring deflection rate per unit of load than that of the coil spring and thus permits a greater displacement of the diaphragm 62 and consequent change in the output resistance of the pressure-sensing unit over the low-pressure portion of the operating range of the gauging system. This results in a greater displacement or swing of the needle of the indicating gauge over a range of low oil pressures as shown by the solid line in FIG. 5 than that obtained from a pressure-sensing unit using the coil spring 224c alone.

It will be further appreciated that the described desirable improvement in the electrical operating characteristic of the disclosed pressure-sensing and indicating system is obtained in a simple mechanical manner without affecting the physical dimensions or size of the pressure sensing unit nor altering in any manner the structure of the indicating device.

I claim:

1. A pressure-responsive current-modulating device operative over a wide range of pressures and including a displaceable member exposed to a source of variable pressure, multiple-rate spring means acting upon said member to oppose displacement thereof, and a variable impedance means operatively responsive to displacement of said member to vary the electrical circuit impedance presented by said device, said spring means comprising a Belleville spring and a coil spring.

2. A pressure-responsive device in accordance with claim 1 wherein said Belleville spring has a lower spring rate than said coil spring.

3. A pressure sensing and indicating system including a fluid pressure responsive current-modulating device of claim 2 and connected in electrical circuit with a source of electrical power and a current-activated indicating device, said system exhibiting an enhanced sensitivity and indicating response over a low fluid pressure portion of the operating range of the system by reason of the mechanical characteristics of the spring means of the fluid pressure responsive device.

4. In a fluid pressure responsive current-modulating device operative over a wide range of fluid pressures and including a cup-shaped member, a flexible diaphragm cover for said member, means connected to said member and defining a chamber one wall whereof is constituted by said diaphragm, means defining a passage for admitting pressure fluid to said chamber, spring means acting between one end of said cup-shaped member and said diaphragm, a cuplike retainer for the end of said spring means bearing against said diaphragm, and a variable resistance means having a movable part operatively responsive to movement of said cuplike retainer as influenced by pressures acting against said diaphragm, the improvement wherein said spring means is possessed of different rates of opposition to displacement of said diaphragm over different portions of the operating range of the device and presents a lower rate of opposition to displacement of the diaphragm over a low fluid pressure portion of the operating range of the device than that presented by the spring means for a higher fluid pressure portion of said operating range, said spring means comprising a Belleville spring positioned adjacent the said one end of said cup-shaped member and a coil spring in force transmitting relation with and bearing at one end against the Belleville spring and at its other end against the diaphragm through said cuplike retainer.

5. A fluid pressure responsive current-modulating device in accordance with claim 4 wherein said Belleville spring has a spring rate less than that of the coil spring.